United States Patent [19]

Ikemoto

[11] Patent Number: 4,598,599

[45] Date of Patent: Jul. 8, 1986

[54] DEVICE FOR PREVENTING REVERSE GEAR BUZZING IN A MANUAL TRANSMISSION

[75] Inventor: Kazuhito Ikemoto, Toyota, Japan

[73] Assignee: Toyota Jidosha Kabushiki Kaisha, Aichi, Japan

[21] Appl. No.: 479,498

[22] Filed: Mar. 28, 1983

[30] Foreign Application Priority Data

Sep. 30, 1982 [JP]  Japan .......................... 57-148136[U]

[51] Int. Cl.$^4$ .................. F16H 57/10; F16H 3/38; B60K 41/26; F16D 11/00
[52] U.S. Cl. .................................... 74/411.5; 74/339; 192/4 A; 192/4 C; 192/53 F
[58] Field of Search ............... 74/411.5, 339; 192/4 A, 192/4 C, 53 F; 403/364, 380; 188/68, 69, 70 R, 71.2

[56] References Cited

U.S. PATENT DOCUMENTS

| | | | |
|---|---|---|---|
| 2,007,897 | 7/1935 | Skeel | 403/364 X |
| 3,745,847 | 7/1973 | Worner et al. | 74/339 |
| 4,016,773 | 4/1977 | Galas et al. | 74/339 X |
| 4,192,410 | 3/1980 | Poirier | 74/339 X |
| 4,225,024 | 9/1980 | Kuzma | 192/53 F |
| 4,294,338 | 10/1981 | Simmons | 74/411.5 X |
| 4,330,053 | 5/1982 | Gesenhaus | 74/411.5 X |
| 4,332,312 | 6/1982 | Sabel et al. | 74/411.5 X |
| 4,370,896 | 2/1983 | Markfeld et al. | 74/339 |

FOREIGN PATENT DOCUMENTS 98451  8/1979  Japan ..................................... 74/339

*Primary Examiner*—Allan D. Herrmann
*Assistant Examiner*—Stephen Andrews
*Attorney, Agent, or Firm*—Parkhurst & Oliff

[57] ABSTRACT

The invention relates to a device for preventing reverse gear buzzing in a manual transmission. The device includes an irrotational or rotationally limited cone supported on a shaft rotatably disposed in a transmission casing. The irrotational cone is coaxial with the shaft and adapted to rotate relative thereto. Means are provided for limiting and stopping rotation of the irrotational cone and a friction ring adapted to be fitted on the conical surface of the irrotational cone. In the preferred embodiment, the rotational stopping means comprises a stopper provided on the irrotational cone and a member provided on the transmission casing for abuttedly engaging the stopper.

8 Claims, 3 Drawing Figures

DEVICE FOR PREVENTING REVERSE GEAR BUZZING IN A MANUAL TRANSMISSION

BACKGROUND OF THE INVENTION

This invention relates a device for preventing reverse gear buzzing upon reverse shifting operation in a manual transmission or to a synchronizing device for reverse shifting operation.

As reverse shifting operation in a manual transmission is conducted in principle when the vehicle is stopped, gears are designed to be slidingly meshed with each other without provision of a synchronizing device, in general. However, recently a low-viscosity lubricating oil for the manual transmission has been often employed in order to reduce fuel consumption of an engine of the vehicle and improve a speed change operation at low temperatures. As a result, even when the clutch is released, the input shaft in the transmission continues to inertially rotate under no-load conditions, thereby causing poor manipulation upon the reverse shifting operation as well as creating reverse gear buzzing. This noise will make the driver unpleasant, and in the worst case, the gears may be damaged. Such a noise tends to be created especially when the engine idling speed is required to be set to a higher value because of operation of an air-conditioning or cooling device in summer.

SUMMARY OF THE INVENTION

Accordingly, it is a primary object of the present invention to provide a device for improving a speed change operation as well as preventing a gear buzzing upon reverse shifting operation in order to eliminate unpleasant feeling of the driver and failure of the gear.

According to the present invention, in combination with a manual transmission provided with a synchromesh mechanism and including a transmission casing, a shaft rotatably disposed in the transmission casing, a clutch hub mounted on the shaft and adapted to rotate synchronously with the shaft, said clutch hub having a spline on its outer circumference, a forward gear mounted on the shaft and adapted to rotate relatively to the shaft, said forward gear being arranged on the front side of the clutch hub, a hub sleeve engaged with the outer circumference of the clutch hub by a spline to be movable in the axial direction of the shaft, a synchronizing cone mounted on the boss portion formed at the rear side of the forward gear and adapted to rotate synchronously with the forward gear, said synchronizing cone having a spline with which the hub sleeve is engaged and a frusto-conical surface converging toward the clutch hub, a synchronizer ring adapted to be press-fitted on the conical surface of the synchronizing cone, a shifting key provided at the spline engaged portion between the hub sleeve and the clutch hub and adapted to engage with the synchronizer ring, wherein upon forward shifting operation, the hub sleeve is engaged with the clutch hub and the synchronizing cone, and the forward gear rotates synchronously with the shaft, and upon reverse shifting operation, the hub sleeve is idly moved in the opposite direction to that in the forward shifting operation; a device for preventing reverse gear buzzing is disclosed herein, which comprises an irrotational cone or rotationally limited cone mounted on the boss portion formed on the rear side of the clutch hub and adapted to rotate relative to the clutch hub, said irrotational cone having a frusto-conical surface diverging rearwardly on its outer periphery, means for stopping rotation of the irrotational cone and a friction ring adapted to be press-fitted on the conical surface of the irrotational cone and engaged with the shifting key, wherein upon reverse shifting operation, the friction ring is urged rearwardly by the shifting key to press the outer circumference of the irrotational cone, thereby reducing or stopping inertial rotation of the shaft.

In particular, since the irrotational cone is relatively rotatably mounted on the shaft and the rotation of the irrotational cone is stopped by the projection formed on the transmission casing, the irrotational cone and the friction ring may be assembled coaxially with the shaft, and thereby there remains no fear of noises made by the loose rotation of the friction ring which results from the eccentric arrangement between the shaft and the irrotational cone, and their assembling may be improved.

The present invention will become more fully apparent from the claims and the description as it proceeds in connection with the drawings.

DETAILED DESCRIPTION OF THE PREFERRED EMBODIMENTS

Figure 1:
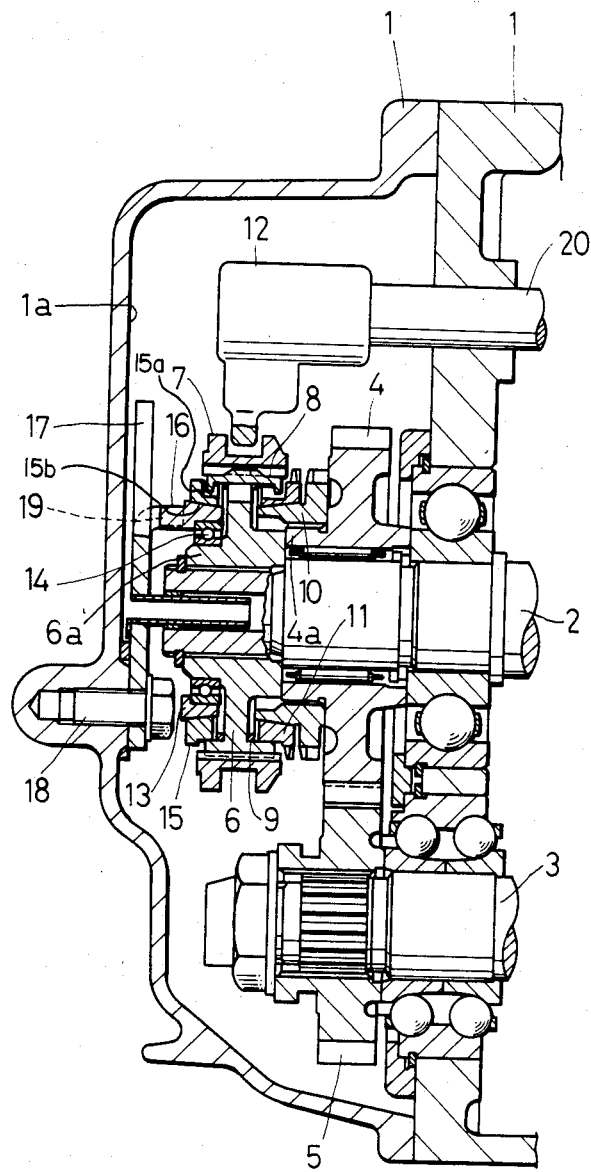
FIG. 1 is a fragmentary sectional view of a manual transmission of an embodiment according to the present invention.
Figure 2:
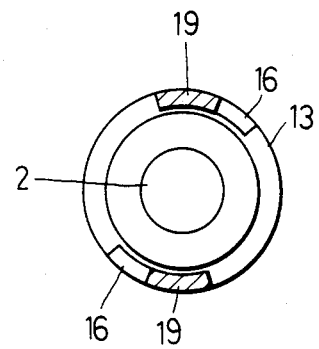
FIG. 2 is a fragmentary view illustrating the relationship between a stopper and a catch projection in FIG. 1.

Referring now to FIG. 1 in which a part of a manual transmission is shown, an input shaft 2 and an output shaft 3 are rotatably disposed in a transmission casing 1 and are arranged in parallel relation with each other. A forward gear 4 is rotatably mounted on the input shaft 2 through a bearing. A driven gear 5 is fixed on the output shaft 3 in such a manner as to be always meshed with the forward gear 4. A clutch hub 6 is secured to the input shaft 2 by means of serration engagement or others, being arranged adjacent to the left-hand side or the rear side of the forward gear 4. A hub sleeve 7 is slidably engaged through a spline with the outer periphery of the clutch hub 6. There is provided, as is known in the art, a shifting key 8 between the clutch hub 6 and the hub sleeve 7 in such a manner as to be urged by a key spring 9 against the hub sleeve 7. A synchronizing cone 10 is secured to a left-hand side hub portion 4a of the forward gear 4 by means of serration engagement or others. The cone 10 includes a spline with which the hub sleeve 7 is engaged and a frusto-conical surface. A synchronizer ring 11 is mounted on the frusto-conical surface of the synchronizing cone 10, being arranged oppositely to the hub sleeve 7. The shifting key 8 is inserted into a key way (not shown) of synchronizer ring 11, and acts to bring a spline of the hub sleeve 7 into opposed relation with a spline of the synchronizer ring 11, which opposed condition is referred to as "index". The ring 11 is engaged with the shifting key 8 and is rotated together with the hub sleeve 7. When the hub sleeve 7 moves toward the forward gear 4, the ring 11 is pressed against the synchronizing cone 10 through the shifting key 8. A shift fork 12 is engaged with the hub sleeve 7 in such a manner as to allow rotation of the hub sleeve 7 as well as axial movement thereof. The shift fork 12 is carried by a fork shaft 20 which is axially movably mounted on the transmission casing 1, and a shift arm (not shown) is attached to the right-hand portion of the fork shaft 20. When the fork 12 is leftwardly or rearwardly moved as viewed in FIG. 1, the reverse shift position is obtained through the conventional sliding mesh mechanism. An irrotational cone 13 or rotationally limited cone is mounted on a boss portion 6a of the clutch hub 6 on the left-hand side of the clutch hub 6 through a ball bearing 14, so as to rotate relative to the clutch hub 6. The cone 13 has a frusto-conical surface diverging toward the left-hand end thereof as viewed in FIG. 1. The bearing 14 may be replaced by a bushing. There is provided a friction ring 15 between the clutch hub 6 and the irrotational cone 13. The tapering angle of the inner circumference of the friction ring 15 is identical with that of the outer circumference of the cone 13. The friction ring 15 is settled in the same manner as the synchronizer ring 11 arranged between the clutch hub 6 and the synchronizing cone 10. In other words, the friction ring 15 is provided with a key way 15a extending in the axial direction thereof on the outer periphery for receiving the sliding shifting key 8. The key way 15a has a stepped portion 15b for permitting abutment of the friction ring 15 against the tapering surface of the irrotational cone 13 by movement of the shifting key 8. The friction ring 15 is engaged with the shifting key 8 and is rotated together with the hub sleeve 7. When the hub sleeve 7 moves leftwardly as viewed in FIG. 1, the ring 15 is pressed against the outer circumference of the irrotational cone 13 through the shifting key 8. Therefore, the friction ring 15 may be regarded as a synchronizer ring without a chamfer. In a modified embodiment, a synchronizer ring with a chamfer may be used in place of the friction ring 15. There are provided stoppers 16 projecting from the left end surface of the irrotational cone 13 toward the inner surface 1a of the transmission casing 1, which stoppers 16 are arranged 180° spaced apart from each other. A bracket 17 is attached to the inner surface 1a of the transmission casing 1 by means of a bolt 18. The bracket 17 has catch projections 19 opposite to the irrotational cone 13 and arranged on the same circumference as that of the stoppers 16 and arranged 180° spaced apart from each other in such a manner that the stoppers 16 may be butted against the catch projections 19 so as to permit limited rotation of the cone 13, but, prevent the rotation of the irrotational cone 13 upon engagement of stopper 16 and projection 19. (See FIG. 2.)

In operation, when the forward shifting operation is conducted, the fork shaft 20 is moved rightwardly as viewed in FIG. 1, and the hub sleeve 7 is also moved rightwardly through the shift fork 12. As a result, synchronous rotation is achieved through the shifting key 8, the synchronizer ring 11 and the synchronizing cone 10, and the hub sleeve 7 is engaged with the synchronizing cone 10, and then the input shaft 2 is connected with the forward gear 4, thereby permitting their synchronous rotation.

To the contrary, when the reverse shifting operation is conducted, the fork shaft 20 is moved leftwardly as viewed in FIG. 1 to obtain a reverse shift position. During the reverse shifting operation, the hub sleeve 7 is moved leftwardly through the shift fork 12. As a result, the friction ring 15 which rotates synchronously with the clutch hub 6 through the shifting key 8 is urged leftwardly as viewed in FIG. 1 by the shifting key 8 and is frictionally abutted against the outer circumferential surface of the irrotational cone 13, resulting in brakeage with respect to the input shaft 2 which will inertially rotates after releasing the clutch. Thus, the rotation of the input shaft 2 is reduced or stopped. At the beginning of the reverse shifting operation, the shifting key 8 serves to make the friction ring 15 pressed against the irrotational cone 13, but during the reverse shifting operation, the axial engagement of the shifting key 8 and the hub sleeve 7 is released, and as a result, the pressure of the friction ring 15 against the irrotational cone 13 is released, thereby creating almost no load during reverse driving.

Figure 3:
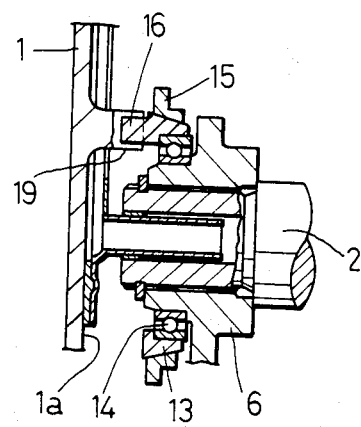
FIG. 3 is a fragmentary sectional view of the essential part of a manual transmission according to another embodiment.

Though the transmission casing 1 carries the bracket 17 having the catch projections 19 in the above embodiment, the catch projection 19 may be integrally formed on the inner surface 1a of the transmission casing 1 as shown in FIG. 3.

While the invention has been described with reference to a few preferred embodiments thereof, it is to be understood that modifications or variations may be easily made without departing from the scope of the present invention which is defined by the appended claims.

What is claimed is:

1. In combination with a manual transmission provided with a synchromesh, mechanism and including a transmission casing, a shaft rotatably disposed in said transmission casing, a clutch hub mounted on said shaft and adapted to rotate synchronously with said shaft, said clutch hub having a spline on its outer circumference, a forward gear mounted on said shaft and adapted to rotate relative to said shaft, said forward gear being arranged on one side of said clutch hub, a hub sleeve engaged with the outer circumference of said clutch hub by a spline movable in the axial direction of said shaft, a synchronizing cone mounted on a boss portion formed on a side of said forward gear adjacent said one side of said clutch hub and adapted to rotate synchronously with said forward gear, said synchronizing cone having a spline with which said hub sleeve is engaged and a frusto-conical surface converging toward said clutch hub, a synchronizer ring adapted to be fitted on the conical surface of said synchronizing cone during synchronizing operation, an index member provided at said hub sleeve and adapted to be moved with said hub sleeve for bringing the spline of said hub sleeve into opposed relation with a spline of said synchroniziner ring, wherein upon forward shifting operation, said hub sleeve is engaged with said clutch hub and said synchronizing cone, and said forward gear rotates synchronously with said shaft, and upon reverse shifting operation, said hub sleeve is idly moved in an opposite direction to that in the forward shifting operation; a device for preventing reverse gear buzzing comprising an irrotational cone supported on said shaft in coaxial relation thereto on an opposite side of said clutch hub and adapted to rotate relative to said shaft, said irrotational cone having a frusto-conical surface on its outer periphery diverging in a direction opposite to said clutch hub, abutment means for limiting and stopping rotation of said irrotational cone and permitting said irrotational cone to move radially, said abutment means including at least one stopper located on the irrotational cone and at least one engaging member located on an inner surface of said transmission casing and projecting toward said stopper on said irrotational cone for abuttedly engaging with said stopper to permit limited relative rotation between the stopper on the irrotational cone and the engaging member on the transmission casing, and a friction ring coaxial with said shaft and adapted to be fitted on the conical surface of said irrotational cone, wherein upon reverse shifting operation, said friction ring is urged rearwardly by said index member to press against the outer circumference of said irrotational cone.

2. The device as defined in claim 1, wherein said stoppers are arranged 180° spaced apart from each other and rearwardly project from the rear end of said irrotational cone.

3. The device as defined in claim 1, and further comprising a bracket fixed on the inner surface of said transmission casing, wherein said engaging member projects from said bracket toward said stopper.

4. The device as defined in claim 1, wherein said engaging members are arranged 180° spaced apart from each other.

5. The device as defined in claim 1, wherein said index member is provided at an engagement portion between said hub sleeve and said clutch hub, and is a shifting key adapted to be engaged with said synchronizer ring.

6. The device as defined in claim 5, wherein said friction ring is provided with a key way extending in the axial direction thereof on the outer periphery for receiving said sliding shifting key, said key way having a stepped portion for permitting abutment of said friction ring against said conical surface of said irrotational cone by the movement of said shifting key.

7. The device as defined in claim 1, wherein said irrotational cone is supported on said clutch hub in coaxial relation thereto, and adapted to rotate relative to said clutch hub.

8. The device as defined in claim 7, and further comprising a ball bearing interposed between said irrotational cone and said boss portion of said clutch hub.

* * * * *